UNITED STATES PATENT OFFICE.

MORIZ WEINRICH, OF YONKERS, NEW YORK.

PROCESS OF TREATING SUGAR-BEETS.

950,035.

Specification of Letters Patent. Patented Feb. 22, 1910.

No Drawing.

Application filed November 28, 1908. Serial No. 464,837.

*To all whom it may concern:*

Be it known that I, MORIZ WEINRICH, a citizen of the United States, residing at Yonkers, in the county of Westchester and State of New York, have invented certain new and useful Improvements in Processes of Treating Sugar-Beets, of which the following is a specification.

My invention relates to the treatment of sugar beets for the manufacture of sugar, and the invention consists of the process which I will hereinafter describe and claim.

In a prior patent granted to me on the 10th day of March, 1908, No. 881,641, I describe a process of treating sugar beets wherein limed beet mush is heated to 60–65° C., the excess of lime then neutralized by means of phosphoric acid, then heated further to 70–75° C., and finally the thus defecated and neutralized juice is extracted by passing it through roller presses.

In my experiments I have found that by heating the alkaline beet-mush to 60–65° C. some pectin matters become dissolved and lime salts formed. The pectin can be eliminated later by boiling the extracted juice with lime and filtering it, but it is well known that the detrimental lime-salts are exceedingly difficult to get rid of, or to decompose.

An essential object of the present invention is to prevent the formation of lime-salts before mentioned, and this I accomplish substantially as follows: I take finely comminuted sugar beets and intimately mix with the same in some suitable vessel, about 30% of their weight of cold water or cold thin juice in which $\frac{1}{4}$ to $\frac{1}{3}$% of caustic lime (CaO.) of weight of beets has been previously slaked. This thin milk of lime is permitted to act for about five (5) minutes on the juice contained in the beet mush whereby a cold defecation is attained. Thereupon enough of a 1 to 2% solution of phosphoric acid $(PO_5)$ is added to the solution and carefully mixed therewith until the mush shows only a faint alkaline reaction. By this procedure not only a cold defecation but also a cold neutralization of the juice contained in the beet is obtained, thus avoiding the dissolving of pectin matters and also the formation of lime-salts. By the term "cold" as herein employed, I mean that the temperature of the mush shall not exceed 25° C. The beet mush treated in the manner described is now heated to approximately 75° C. and the juice extracted by pressing, as by passing it through roller presses.

The apparatus described in my aforesaid former patent, No. 881,641, may be used to good advantage for the present process, although any other apparatus capable of working the operations before described is within the scope of my present invention.

In order to reduce the expenses for neutralization, the thin solution of phosphoric acid may become saturated with carbonic acid gas, or sulfurous acid gas, or mixed with some oxalic acid $(C_2O_3HO)$. I generally prefer, however, the use of phosphoric acid alone because when using $\frac{1}{4}$% of lime, the amount of the acid required is small, while the phosphate of lime formed and deposited in the pressed pulp increases the feeding value of the pulp and thereby compensates for part of the cost of the acid used. The extracted juice is designed to be treated with some more lime and is then neutralized and finished in one of the ways well known in this art.

The before described process may also be employed to advantage with diffusion or lixiviating processes. For this purpose the beet chips are intimately commingled in a suitable mixer with a thin milk of lime in the manner hereinbefore described for treating beet mush and then its alkalinity is likewise reduced by adding a thin solution of phosphoric acid, or a mixture of phosphoric acid and carbonic acid or sulfurous acid or oxalic acid in the cold state. The beet-chips thus treated are then subjected to diffusion process or a combined lixiviating or pressing process and the resultant juice is then finished according to some one of the well known methods usually employed for this purpose. When using this latter variation of my process, however only a part of the advantages enumerated in my aforesaid patent 881,641 will be attained. On the other hand, existing factories could carry on the process with small extra expense for additional machinery.

Having thus described my invention what I claim as new and desire to secure by Letters Patent is:—

1. The process herein described of cold neutralization of beet juice consisting essentially in adding milk of lime to beet mush or beet chips before diffusion or extraction by pressure and while in a cold state, then adding sufficient phosphoric acid to neutralize the excess of lime, then heating the mixture to about 75° C., and finally extracting the thus neutralized juice.

2. The process herein described of cold neutralization of beet juice consisting essentially in adding milk of lime to beet mush or beet chips before diffusion or extraction by pressure and while in a cold state, then adding sufficient of an acid solution to neutralize the excess of lime and impart to the mush or chips a slight alkaline reaction, then heating the mixture to about 75° C., and finally extracting the thus neutralized juice.

In testimony whereof I affix my signature in presence of two witnesses.

MORIZ WEINRICH.

Witnesses:
   JAMES S. FITCH,
   THEODORE FITCH.